May 5, 1970   H. V. ELLIOTT ET AL   3,510,839
COMBINED DIRECTION SIGNAL AND HAZARD WARNING
MECHANISM AND SWITCH STRUCTURE
Filed Nov. 14, 1966   2 Sheets-Sheet 1

INVENTORS
Harold V. Elliott,
Willard E. Graddy &
Daniel W. Hyden

BY Albert H. Duke
ATTORNEY

INVENTORS
Harold V. Elliott,
Willard E. Graddy &
Daniel W. Hyden
BY Albert F. Duke
ATTORNEY

United States Patent Office 3,510,839
Patented May 5, 1970

3,510,839
COMBINED DIRECTION SIGNAL AND HAZARD WARNING MECHANISM AND SWITCH STRUCTURE
Harold V. Elliott, Saginaw, Mich., and Willard E. Graddy, Anderson, and Daniel W. Hyden, New Castle, Ind., assignors to General Motors Corporation, Detroit, Mich., a corporation of Delaware
Filed Nov. 14, 1966, Ser. No. 593,971
Int. Cl. B60q 1/38
U.S. Cl. 340—81     4 Claims

ABSTRACT OF THE DISCLOSURE

A combined switch structure for selectively flashing left and right vehicle signal lamps for direction signaling purposes or simultaneously flashing left and right signal lamps for hazard warning purposes which includes stationary contacts extending through a base member and provided with contact surfaces on opposite sides of the base member for selective circuit closing engagement by movable contacts carried by a direction signaling actuator and a hazard warning actuator. Feedback between the two switches in the event of concurrent actuation of the switches is prevented through a cam and follower mechanism actuable by one of the switches to disable a portion of the other switch.

---

This invention relates to direction signal mechanisms and more particularly to a direction signal mechanism including switch means operative by separate actuating members for energizing appropriate signal lamps mounted on a motor vehicle to indicate either a turn or an emergency condition.

Generally, a motor vehicle is provided with left and right signal lamps mounted on the front and rear of the vehicle. The left or right lamps are selectively energized by the vehicle operator through the agency of a switch operating mechanism usually mounted at the steering column and which is manually actuated by the operator preparatory to initiating a turn. Thereafter the mechanism is automatically returned to a neutral position by means of a camming arrangement movable with the steering apparatus.

Occasions arise where it is desirable to simultaneously flash both the left and right signal lamps to indicate an emergency condition such as, for example, when the vehicle is located on the side of the road for repairs.

In accordance with the present invention, a signal control mechanism is provided which includes a combined direction signal and hazard or emergency warning switch construction which may be selectively operated to energize either the left or right signal lamps to indicate a turn and may be operated to energize both the left and right signal lamps to indicate an emergency condition. The signal mechanism includes means operative with a cancelling cam rotatable with the vehicle steering apparatus to provide automatic cancellation of the turn signal or emergency indications. As will be more apparent hereinafter the direction signal and hazard warning switch structure includes stationary contacts engageable by movable contacts supported adjacent opposite ends of the stationary contact to energize the signal lamps on either side of the vehicle or on both sides of the vehicle.

A more complete understanding of the present invention may be had from the following detailed description which should be read in conjunction with the drawings in which.

Figure 1:
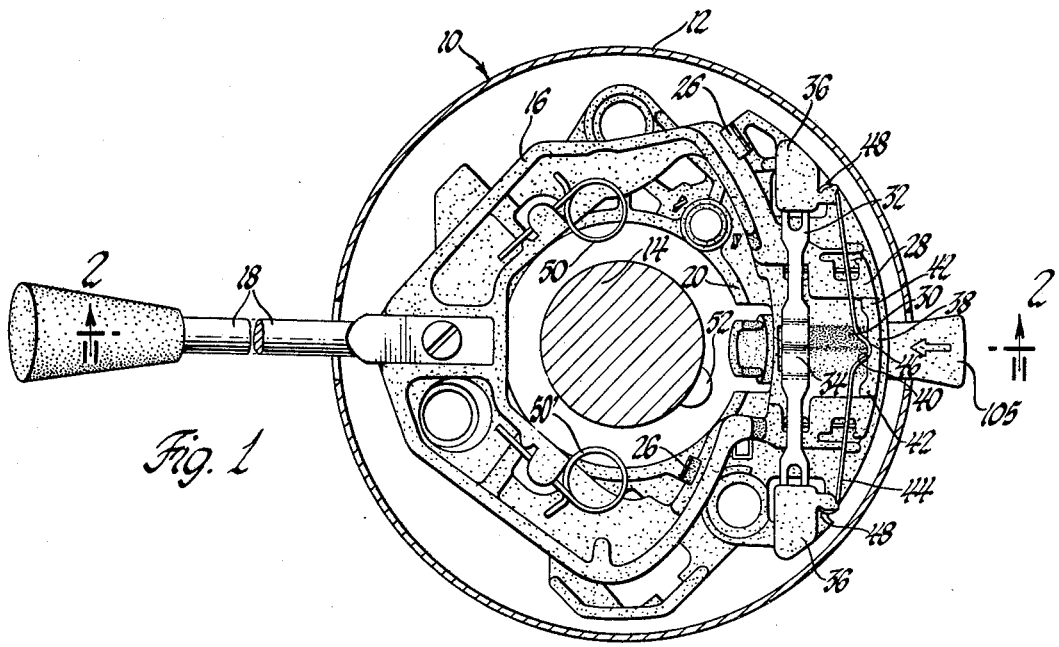
FIG. 1 is a top plan view showing the mechanism of the present invention in a neutral position.
Figure 2:
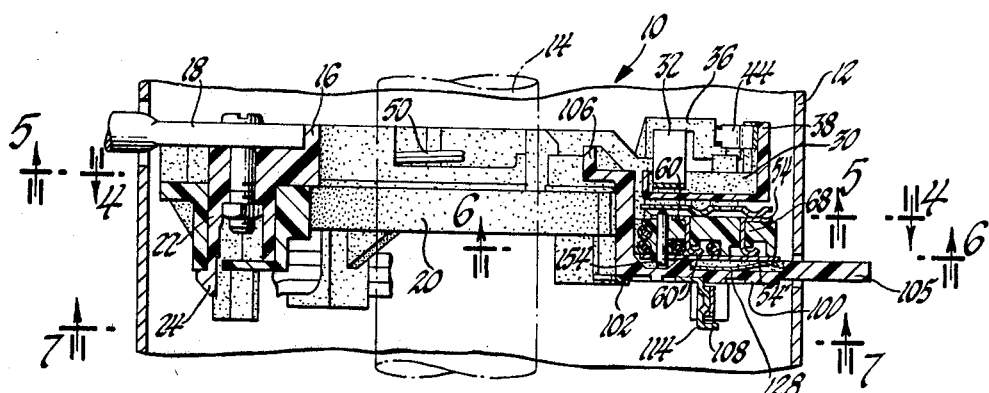
FIG. 2 is a sectional view taken along lines 2—2 of FIG. 1.

Referring now to the drawings, and initially to FIGS. 1 and 2, the mechanism of the present invention is generally designated 10 and is adapted to be mounted by means (not shown) within a housing 12 surrounding the steering shaft 14. The mechanism 10 includes an actuating member 16 to which is attached an operating lever 18. The actuating member 16 is pivotally mounted to a base member 20 by means of a pivot post 22 having an integrally formed flexible finger 24 which maintains the actuating member 16 is engagement with the base member 20. The base member 20 is also provided with upstanding integrally formed flexible fingers 26 which snap into engagement with a portion of the actuating member 16. A projection 28 of the actuating member 16 generally opposite the pivot post 22 is provided with a groove 30 which cooperates with a detent spring 32 to provide detent means for releasably latching the actuating member 16 in either of two operating or turn indicating positions. The spring 32 includes an undulating portion 34 between the ends which normally seats in the groove 30 to maintain the actuating member in a neutral position. The opposite ends of the spring 32 include openings to receive a downwardly projecting finger (not shown) located on upstanding columns 36 of the base 20. The projection 28 of the actuating member 16 also includes an upstanding wall 38 having a centrally located groove 40 and a pair of shoulders 42 on opposite sides thereof. A second spring 44 has a protuberance 46 located between bent-in hooks 48 on the opposite ends thereof which engage the columns 36 on the base 20. The spring 44 and shoulders 42 cooperated to provide yieldable stop means at a lane change position between the neutral and turn indicating positions of the actuating member 16. The actuating member 16 is provided with a pair of cancelling pawls 50 and 50' located on opposite sides of the pivot post 22. The pawls 50 and 50' are adapted to cooperate with a cam 52 mounted on the steering shaft to automatically return the actuating member 16 to a neutral position in the conventional manner after completion of a turn.

If the operator desires to indicate a lane change to the right the lever 18 is moved in a clockwise direction. The actuating member 16 is thus pivoted about its axis relative to the springs 32 and 44. The shoulder 42 approaches the protuberance 46 of the spring 44 and upon contact therewith, provides a recognizable resistance to further movement of the actuating member 16 in a clockwise direction. This resistance is transmitted to the lever 18 resulting in an awareness thereof by the operator. In this position, the contact structure, which will be described more fully hereinafter, completes a circuit to the right-hand signaling lamps. Upon release of the lever 18, the mechanism will return to the position shown in FIG. 1. If the operator intends to make a turn as distinguished from a lane change, the lane change position is overridden by further movement of the lever 18 in a clockwise direction to a position wherein the protuberance 46 of the spring 44 is located on the shoulder 42 and the undulating portion 34 of the spring 32 is located completely out of the groove 30. Rotation of the steering mechanism in a clockwise direction results in the cancelling pawl 50 being moved out of the path of travel of the cam 52 without affecting the position of the member 16. However, rotation of the steering shaft in a counterclockwise direction after completion of the right-hand turn will result in engagement of the pawl 50 by the cam 52 to return the member 16 to the neutral position shown in FIG. 1.

Figure 4:
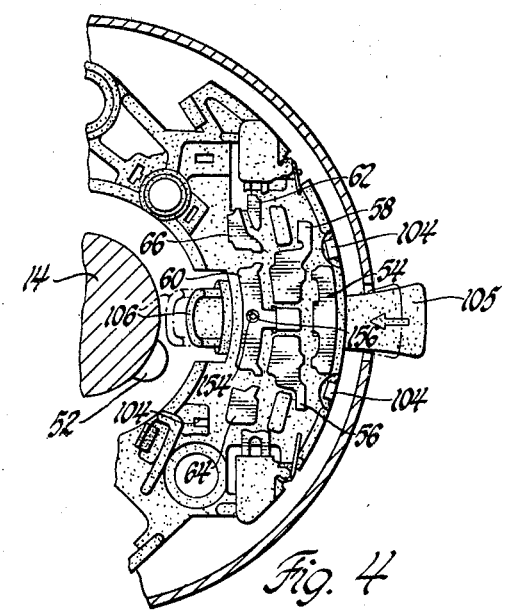
FIG. 4 is a sectional view taken along lines 4—4 of FIG. 2.
Figure 6:
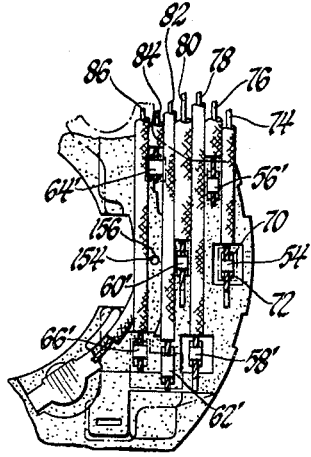
FIG. 6 is a partial view taken along lines 6—6 of FIG. 2.

Referring now to FIGS. 2, 4 and 6, the combined turn signal and hazard warning switch construction includes stationary contacts 54 through 66 each of which includes an integral portion 68 extending through the base member 20. The portions 68 are sheared to provide three fingers or contact surfaces. Two of the contact surfaces are designated 70 and 72 and are bent over preparatory to assembling conductors 74 through 86. Thereafter, the remaining contact surfaces designated 54'-66' are bent over the conductors 74-86, respectively to insure a good electrical connection between the contacts 54-66 and to present contact surfaces 54'-66' for a purpose hereinafter more fully described.

Figure 5:
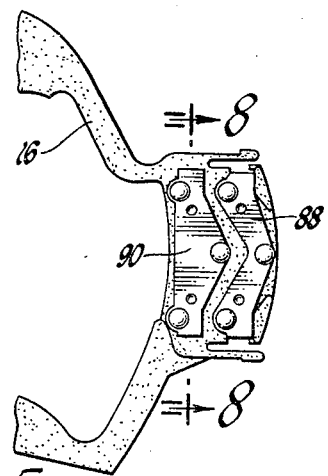
FIG. 5 is a partial view taken along lines 5—5 of FIG. 2.
Figure 8:
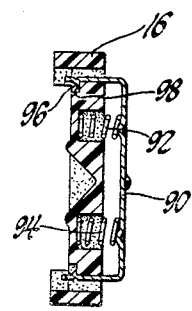
FIG. 8 is a sectional view taken along lines 8—8 of FIG. 5.

Referring now to FIGS. 5 and 8, the actuating member 16 carries a pair of generally triangular shaped contacts 88 and 90 which are each yieldably biased away from the member 16 by springs 92 and 94. Each of the contacts 88 and 90 are provided with tangs 96 which seat on shoulders 98 formed in the member 16.

Figure 7:
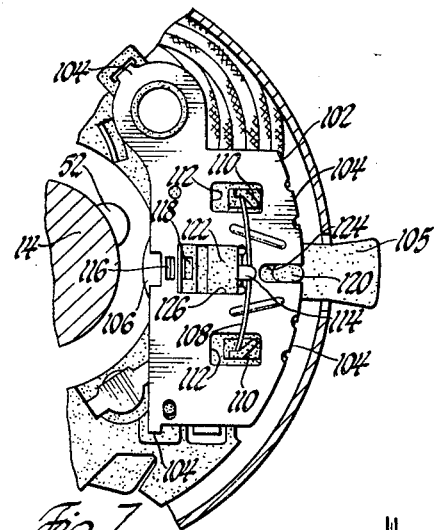
FIG. 7 is a partial view taken along lines 7—7 of FIG. 2.

As shown in FIGS. 2, 4 and 7 a hazard warning actuating member 100 is sandwiched between the base member 20 and a backing plate 102 which is provided with prongs 104 for securing the backing plate to the base member. The member 100 is provided with a knob 105 at one end and a cancelling pawl 106 at the other end. The member 100 is movable from a normal position to an actuated position against the bias of a flat return spring 108. The spring 108 extends between a pair of posts 110 projecting from the member 100 through openings 112 in the plate 102 and engages a post 114 projecting from the plate 102. The plate 102 further includes a detent 116 which seats in a depression 118 formed in the member 100 when the member 100 is moved to an actuated position. The member 100 is further provided with guides 120 and 122 which travel in the slots 124 and 126, respectively. Accordingly, in the normal position as shown in FIG. 7 the pawl 106 is out of the path of travel of the cam 52. In moving the member 100 to the actuated position as shown in dotted lines in FIG. 4 energy is stored in the spring 108 and the detent 116 seats in the depression 118 to maintain the member 100 in the actuated position. Upon rotation of the steering shaft 14 the cam 52 is operative to engage the pawl 106 to return the member 100 to the normal position where it is maintained by the spring 108.

Figure 9:
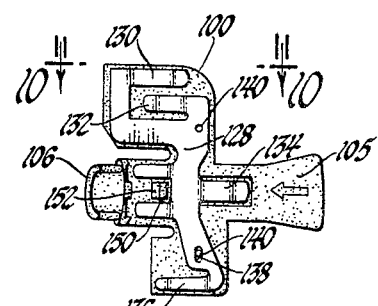
FIG. 9 is a top elevation view of the hazard actuator and movable contact.
Figure 10:
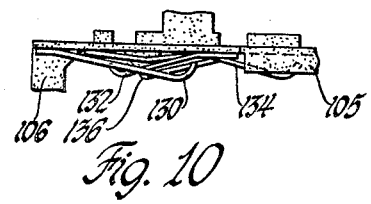
FIG. 10 is an elevation view taken along lines 10—10 of FIG. 9.
Figure 11:
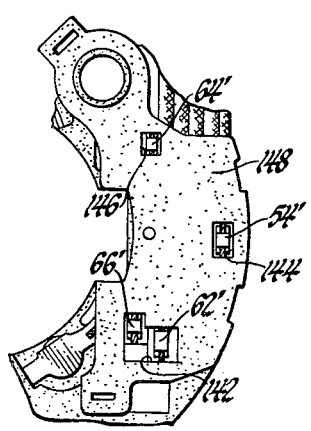
FIG. 11 is a view similar to FIG. 6 and showing an insulating piece adapted to expose an end portion of certain of the stationary contacts of the switch structure.

Referring now to FIGS. 9, 10 and 11, the member 100 carries a movable spring contact 128 provided with four contact fingers 130, 132, 134 and 136. The contact 128 includes a pair of holes 138 which receive alignment pins 140 formed on the member 100. The ends of the contact fingers 130–136 engage the contact surfaces 62', 66', 54' and 64' respectively, when the member 100 is moved to the actuated position. Contact is made through openings 142, 144 and 146 of an insulating member 148 sandwiched between the contact 128 and the conductors 74–86.

The member 100 is provided with a cam portion 150 having an inclined surface 152. When the member 100 is moved to an actuated position, the inclined surface 152 engages a pin 154, see FIG. 2, which is movable in a hole 156 formed in the base member 20 and the stationary contact 60. The upward movement of the pin 154 lifts the movable contact 90 against the bias of the springs 92 and 94 so that the contact 90 is incapable of bridging any of the stationary contacts for a purpose more fully described with regards to FIG. 3.

Figure 3:
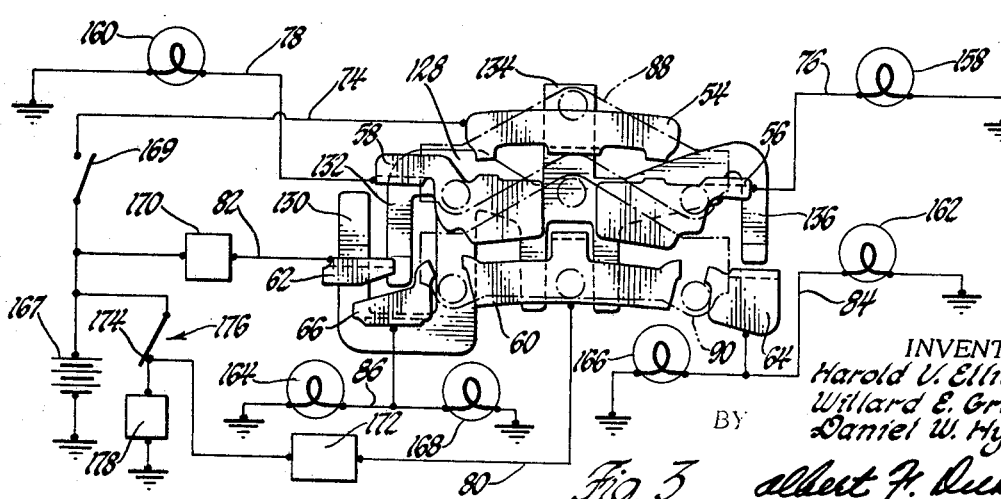
FIG. 3 is a schematic diagram of the signaling system.

Referring now to FIG. 3, a schematic diagram of the signaling system is shown. Right and left rear signal lamps 158 and 160 are connected by the conductors 76 and 78 to the stationary contacts 56 and 58, respectively. Right and left front signal lamps 162 and 164 are connected by the conductors 84 and 86 to the stationary contacts 64, 66, respectively. Indicator lamps 166 and 168 are connected in parallel with lamps 162 and 164, respectively. The conductor 74 connects stationary contact 54 to a battery 167 through a normally open brake operated switch 169 while the conductor 82 connects stationary contact 62 to the battery 167 through a first flasher 170. The conductor 80 connects the stationary contact 60 to the accessory terminal 174 of the vehicle ignition switch 176 through a second flasher 172. Thus, in both the "on" position and in the "accessory" position the ignition switch 176 connects certain vehicle accessories 178 such as a radio and heater as well as the flasher 172 to the battery 167.

The movable contacts 88 and 90 are shown in a neutral position wherein contacts 54, 56 and 58 are bridged by the dimples formed on the contact 88 while the dimples formed on the contact 90 are resting on the lands formed on the base 20 between the contacts 56, 58, 60, 64 and 66. The hazard warning contact 128 is not in engagement with any of the contacts 54', 62', 64', 66'.

With the contacts in the position shown in FIG. 3, closure of the brake switch 169 by actuation of the brake will connect the rear lamps 158 and 160 to the battery through the contact 54 and the bridging contact 88 which engages the contacts 56 and 58. If the hazard warning actuator 100 is moved inwardly while the turn signal actuator 16 is in the neutral position, the spring contact 128 will be moved to a position where the contact fingers 130, 132, 134 and 136 engage the contacts 62', 66', 54', and 64' respectively. The flasher 170 is then operative to flash the lamps 162 and 164, since the contacts 62', 66' and 64' are bridged by the contact 128. The lamps 158 and 160 are also flashed since the contacts 56' and 58' are connected to the contact 62' through bridging contact 88, contacts 54, 54' and 128. Thus, a pulsating current is supplied to the lamps 158 and 160 from the flasher 170 through the conductor 82, contact 62', contact finger 130, contact finger 134, contacts 54', 54, 88, 56 and 58 through the conductors 76 and 78.

If the vehicle operator wishes to signal a right turn the lever 18 is moved in a clockwise direction which shifts the actuator 16 and consequently the movable contacts 88 and 90 toward the right in FIG. 3. In this position the contact 88 bridges the contacts 54 and 58 but is moved off of the contact 56, while the contact 90 bridges contacts 56, 60 and 64. Thus, the lamps 158, 162 and 166 are connected to the flasher 172 through the conductors 80, contact 60, contact 90 to the contacts 56 and 64. If the brake switch 168 is moved to a closed position, the rear lamp 160 will be constantly energized from the battery 167 through the conductor 74 and contact 54, contact 88 and contact 58.

While hazard warning actuator 100 is in the actuated position, the contact 90 is lifted by the pin 154 so as not to engage any of the stationary contacts. This open circuit condition prevents feedback to the vehicle accessories through the turn signal flasher 172 should the actuating member 16 be moved to an operative position.

While the invention has been described with regard to a preferred embodiment thereof, modifications and variations will now occur to those skilled in the art. For a definition of the invention, reference is made to the appended claims.

We claim:

1. A signaling system comprising an electrical power source, a combined direction signal and hazard warning switching mechanism including an insulating base member, first, second and third contact surfaces on one side of said base member, a direction signal actuating member movably mounted to said base member, movable contact means supported by said direction signal actuating member and normally bridging said first, second and third stationary contact surfaces, first second, third and fourth stationary contact surfaces on the opposite side of said base member, a hazard warning actuating member movably mounted to said base member, a movable contact member supported by said hazard warning actuating member and adapted to bridge said first, second, third and fourth contact surfaces on said opposite side of said base member upon actuation of said hazard warning actuating member, first, second, third and fourth signal means, flasher means, conducting means connecting said flasher means to said power source and to said first contact surface on said opposite side of said base member, conducting means connecting said first and second signal means to said second and third contact surfaces on said one side of said base member, conducting means connecting said third and fourth signal means to said second and third contact surfaces on said opposite side of said base member, said fourth contact surface on said opposite side of said base member being integrally connected with said first contact surface on said one side of said base member.

2. A switch structure comprising an insulating base member, first and second switch actuating members, means supporting said first and second actuating members for movement relative to and adjacent opposite sides of said base member, first, second and third stationary contacts supported by said base member and provided with contact surfaces on one side of said base member, at least said second and third stationary contacts extending through said base member and provided with contact surfaces on the opposite side of said base member, first and second movable contacts supported by and movable with said first and second actuating members respectively, said first actuating member being movable from a neutral position wherein said first movable contact is out of engagement with the contact surfaces of said stationary contacts to an actuated position on either side of said neutral position wherein said first movable contact completes an electrical circuit between either said first and second stationary contacts or said first and third stationary contacts, said second actuating member being movable from a normal position to an actuated position bridging the contact surfaces of said second and third contacts on said opposite side of said base member to complete an electrical circuit between said second and third contacts, said second actuating member including cam means, movable therewith, cam follower means extending through said base member and movable by said cam means into engagement with said first movable contact to move said first movable contact away from said base member and thereby prevent engagement of said first movable contact with said stationary contacts regardless of the position of said first actuating member.

3. A signaling system for a motor vehicle provided with a source of electrical power, left and right front and rear signal lamps, first and second flasher means connected to said source, a combined switch comprising a base member, a direction signal actuating member, means coupling the direction signal actuating member to said base member from movement relative thereto from a neutral position to left and right direction signaling positions, first and second movable contacts mounted on said direction signal actuating member and movable therewith, first, second, third, fourth, fifth, and sixth stationary contacts supported by and extending through said base member and including contact surfaces on one side of said base member, said first, second, third, and fourth contacts being connected with respective ones of said signal lamps, said fifth stationary contact being connected with said first flasher means, said first movable contact bridging said third, fourth, and sixth stationary contacts when said direction signal actuating member is in said neutral position, said second movable contact bridging said first, third, and fifth stationary contacts or said second, fourth, and fifth stationary contacts whereby said left or right signal lamps are flashed when said direction signal actuating member is in said left or right direction signaling positions respectively, a seventh stationary contact supported by and extending through said base member and having a contact surface on the opposite side of said base member, said seventh stationary contact being connected with said second flasher means, said first, second and sixth stationary contacts having contact surfaces on said opposite side of said base member, a hazard warning actuating member, a multi-fingered, movable contact carried by said hazard warning actuating member and movable to an actuated position connecting said first, second, and sixth stationary contacts with said seventh stationary contact whereby all of said lamps are simultaneously flashed when said hazard warning actuating member is in said actuated position and said direction signal actuating member is in said neutral position.

4. The system defined in claim 3 wherein said switch further includes an insulating member sandwiched between the contact surfaces on said opposite side of said base member and said multi-fingered movable contact and including openings therein to expose the contact surfaces of said first, second, sixth and seventh contacts, said multi-fingered contact including four contact fingers adapted to engage the contact surfaces of said first, second, sixth and seventh contacts.

References Cited

UNITED STATES PATENTS

| | | | |
|---|---|---|---|
| 1,389,899 | 9/1921 | Riggs. | |
| 1,482,540 | 2/1924 | Benjamin | 340—54 |
| 1,490,005 | 4/1924 | Glass | 200—61.27 |
| 1,716,370 | 6/1929 | Dark et al. | |
| 2,607,864 | 8/1952 | Hollins. | |

JOHN W. CALDWELL, Primary Examiner

K. N. LEIMER, Assistant Examiner

U.S. Cl. X.R.

200—4, 61.27; 340—67